United States Patent
Clayton et al.

(10) Patent No.: US 9,678,707 B2
(45) Date of Patent: Jun. 13, 2017

(54) IDENTIFICATION OF AUDIO CONTENT FACILITATED BY PLAYBACK DEVICE

(71) Applicant: Sonos, Inc., Santa Barbara, CA (US)

(72) Inventors: Eric Clayton, Concord, MA (US); Aurelio Rafael Ramos, Jamaica Plain, MA (US)

(73) Assignee: Sonos, Inc., Santa Barbara, CA (US)

( * ) Notice: Subject to any disclaimer, the term of this patent is extended or adjusted under 35 U.S.C. 154(b) by 103 days.

(21) Appl. No.: 14/684,208

(22) Filed: Apr. 10, 2015

(65) Prior Publication Data

US 2016/0299737 A1    Oct. 13, 2016

(51) Int. Cl.
*H04R 29/00* (2006.01)
*G06F 3/16* (2006.01)
(Continued)

(52) U.S. Cl.
CPC .............. *G06F 3/165* (2013.01); *G11B 27/34* (2013.01); *H04R 27/00* (2013.01);
(Continued)

(58) Field of Classification Search
CPC ............. G06F 3/04847; G06F 3/04842; G06F 17/3074; G06F 17/30283; G06F 17/30743;
(Continued)

(56) References Cited

U.S. PATENT DOCUMENTS 5,440,644 A    8/1995 Farinelli et al.
5,761,320 A    6/1998 Farinelli et al.
(Continued)

FOREIGN PATENT DOCUMENTS

EP    1389853 A1    2/2004
WO    0153994    7/2001
(Continued)

OTHER PUBLICATIONS

"AudioTron Quick Start Guide, Version 1.0", Voyetra Turtle Beach, Inc., Mar. 2001, 24 pages.
(Continued)

*Primary Examiner* — Vivian Chin
*Assistant Examiner* — Ubachukwu Odunukwe
(74) *Attorney, Agent, or Firm* — McDonnell Boehnen Hulbert & Berghoff LLP

(57) ABSTRACT

An example playback device includes one or more processors and a non-transitory computer-readable medium storing instructions that, when executed by the one or more processors, cause the playback device to perform functions. The functions include receiving digital data representing audio content. The functions further include sending at least a portion of the digital data to an identification system configured to identify the audio content based on the at least a portion of the digital data. The functions further include receiving information associated with the audio content from the identification system. The functions further include, in response to receiving the information associated with the audio content from the identification system, sending the received information to a control device that is configured to control the playback device. The functions further include playing the audio content via one or more speakers electrically connected to the playback device via a wired connection.

22 Claims, 10 Drawing Sheets

(51) Int. Cl.
  *H04R 27/00* (2006.01)
  *G11B 27/34* (2006.01)
  *H04L 29/06* (2006.01)
  *G06F 17/30* (2006.01)
  *H04H 60/37* (2008.01)

(52) U.S. Cl.
  CPC ....... *G06F 17/30283* (2013.01); *H04H 60/37* (2013.01); *H04L 67/42* (2013.01); *H04R 2227/005* (2013.01)

(58) Field of Classification Search
  CPC ......... G06F 17/30755; G06F 17/30787; G06F 17/30861; G06F 3/165; H04L 65/4092; H04L 67/42; H04H 60/37; G11B 27/28; G10L 25/48; H04N 21/44; H04R 27/00
  USPC ..... 381/58, 56, 77, 71.6, 307, 123; 709/231, 709/203; 715/716; 707/758; 386/201
  See application file for complete search history.

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,054,450 | B2 | 5/2006 | McIntosh et al. |
| 7,110,559 | B2 | 9/2006 | Behboodian et al. |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,242,784 | B2 | 7/2007 | Cranfill et al. |
| 7,248,935 | B2 | 7/2007 | Teramachi et al. |
| 7,295,548 | B2 | 11/2007 | Blank et al. |
| 7,483,538 | B2 | 1/2009 | McCarty et al. |
| 7,496,418 | B2 | 2/2009 | Kim et al. |
| 7,571,014 | B1 | 8/2009 | Lambourne et al. |
| 7,603,190 | B2 | 10/2009 | Takayama et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,668,571 | B2 | 2/2010 | Na et al. |
| 7,680,284 | B2 | 3/2010 | Lee et al. |
| 7,688,989 | B2 | 3/2010 | Willems et al. |
| 7,711,316 | B2 | 5/2010 | Bae |
| 7,734,054 | B2 | 6/2010 | Asada |
| 7,769,184 | B2 | 8/2010 | Kino et al. |
| 7,773,755 | B2 | 8/2010 | Terauchi et al. |
| 7,822,213 | B2 | 10/2010 | Choi et al. |
| 7,853,341 | B2 | 12/2010 | McCarty et al. |
| 7,860,260 | B2 | 12/2010 | Kim et al. |
| 7,869,611 | B2 | 1/2011 | Asada |
| 7,936,886 | B2 | 5/2011 | Kim |
| 7,949,140 | B2 | 5/2011 | Kino |
| 7,961,893 | B2 | 6/2011 | Kino |
| 7,987,294 | B2 | 7/2011 | Bryce et al. |
| 8,014,423 | B2 | 9/2011 | Thaler et al. |
| 8,031,884 | B2 | 10/2011 | Lee et al. |
| 8,045,952 | B2 | 10/2011 | Qureshey et al. |
| 8,103,009 | B2 | 1/2012 | McCarty et al. |
| 8,111,830 | B2 | 2/2012 | Moon et al. |
| 8,111,831 | B2 | 2/2012 | Asada et al. |
| 8,160,887 | B2 | 4/2012 | Fukushima |
| 8,229,137 | B2 | 7/2012 | Romesburg |
| 8,234,395 | B2 | 7/2012 | Millington et al. |
| 8,295,493 | B2 | 10/2012 | Faller |
| 8,345,886 | B2 | 1/2013 | Park |
| 8,374,361 | B2 | 2/2013 | Moon et al. |
| 8,428,421 | B2* | 4/2013 | Bhogal ..................... H04N 5/85 386/201 |
| 8,472,632 | B2 | 6/2013 | Riedel et al. |
| 8,483,853 | B1 | 7/2013 | Lambourne |
| 8,634,564 | B2 | 1/2014 | Sakai |
| 8,655,663 | B2 | 2/2014 | Matsuoka et al. |
| 8,666,528 | B2 | 3/2014 | Harkness et al. |
| 8,798,274 | B2 | 8/2014 | Sakai et al. |
| 8,842,842 | B2 | 9/2014 | Eppolito et al. |
| 8,903,523 | B2 | 12/2014 | Higuchi et al. |
| 8,913,189 | B1 | 12/2014 | Mincher et al. |
| 8,964,999 | B2 | 2/2015 | Kon |
| 8,965,005 | B1 | 2/2015 | Gopalakrishnan et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty |
| 2004/0024478 | A1 | 2/2004 | Hans et al. |
| 2006/0104453 | A1 | 5/2006 | Lee et al. |
| 2007/0051226 | A1 | 3/2007 | Diaz |
| 2007/0142944 | A1 | 6/2007 | Goldberg et al. |
| 2010/0166225 | A1 | 7/2010 | Watanabe et al. |
| 2010/0331048 | A1 | 12/2010 | Xiang et al. |
| 2011/0301731 | A1 | 12/2011 | Okimoto et al. |
| 2012/0250914 | A1 | 10/2012 | Fino |
| 2012/0294446 | A1 | 11/2012 | Visser et al. |
| 2013/0294050 | A1 | 11/2013 | Lee et al. |
| 2013/0294618 | A1 | 11/2013 | Lyubachev |
| 2014/0093108 | A1 | 4/2014 | Watanabe |
| 2014/0270187 | A1 | 9/2014 | Hall et al. |
| 2014/0270188 | A1 | 9/2014 | Hall et al. |
| 2014/0280265 | A1* | 9/2014 | Wang ..................... H04H 60/37 707/758 |
| 2014/0321670 | A1 | 10/2014 | Nystrom et al. |
| 2014/0328506 | A1 | 11/2014 | Banks et al. |
| 2015/0036847 | A1 | 2/2015 | Donaldson |
| 2015/0036848 | A1 | 2/2015 | Donaldson |
| 2015/0039726 | A1 | 2/2015 | Hoffert et al. |
| 2015/0171813 | A1 | 6/2015 | Ganatra |
| 2015/0199122 | A1* | 7/2015 | Garmark ................. H04L 67/42 715/716 |
| 2015/0256954 | A1 | 9/2015 | Carlsson et al. |

FOREIGN PATENT DOCUMENTS

| | | |
|---|---|---|
| WO | 03093950 A2 | 11/2003 |
| WO | 2004062098 A1 | 7/2004 |

OTHER PUBLICATIONS

"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo" Analog Stereo Jun. 24, 2000 retrieved Jun. 18, 2014, 2 pages.
Louderback, Jim, "Affordable Audio Receiver Furnishes Homes With MP3" TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.

(56) References Cited

OTHER PUBLICATIONS

UPnP; "Universal Plug and Play Device Architecture," Jun. 8, 2000; version 1.0; Microsoft Corporation; pp. 1-54.
"Denon 2003-2004 Product Catalog," Denon, 2003-2004, 44 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

* cited by examiner

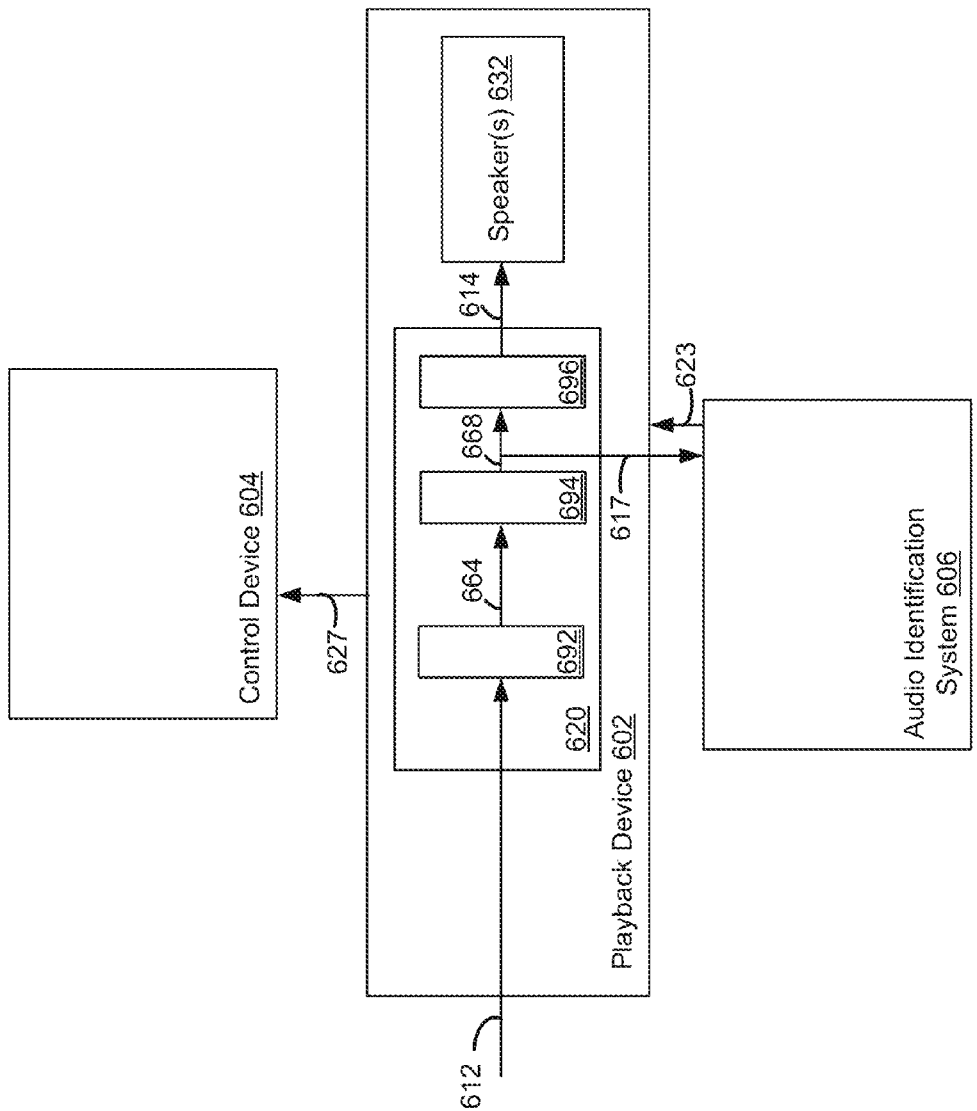

IDENTIFICATION OF AUDIO CONTENT FACILITATED BY PLAYBACK DEVICE

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 6C shows an example playback device extracting digital data for audio content identification from a second position of an audio pipeline;

Figure 1:
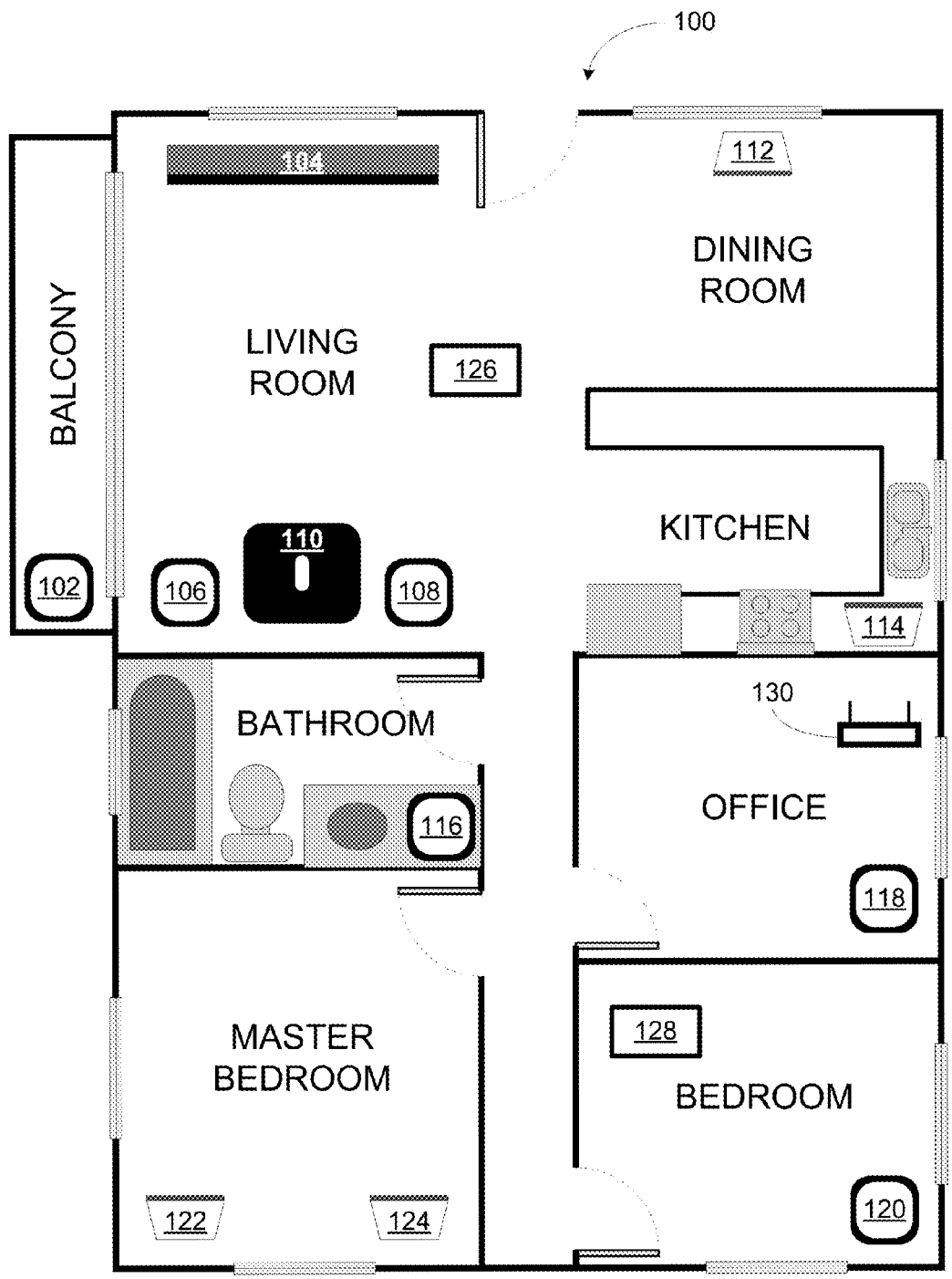
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

In various situations, it may be useful for a playback device to receive digital data and use the digital data in at least two ways. For example, the playback device may (i) use the digital data to play audio content represented by the digital data and (ii) use the digital data to facilitate retrieval of information related to the audio content. For example, the playback device may be configured to provide metadata to a control device, where the metadata is related to the audio content that is played by the playback device. In some situations, however, the received digital data might be lacking in particular categories of metadata or might not include metadata at all. Therefore, it can be useful for the playback device, perhaps while playing the audio content, to use the received digital data to facilitate retrieval of metadata from a content identification system.

It may be efficient to have the playback device—instead of the control device, for example—use the digital data to facilitate retrieval of the information from the content identification system. For example, during playback the playback device may already be receiving and/or processing the digital data, whereas the control device would then have to receive the digital data from the playback device before using the digital data to facilitate retrieval of the information. In other examples, the control device might not be configured to receive the digital data at all. In this context, the control device facilitating retrieval of the information might disadvantageously require (i) using a microphone to capture analog waveforms of the audio content being played by the playback device, (ii) converting the analog waveforms into digital information, and (iii) sending the digital information to the content identification system. Use of the playback device to facilitate retrieval of the information from the content identification system may avoid the control device performing some or all of such functions. Having the playback device facilitate retrieval of the information from the content identification system may have other benefits as well.

Accordingly, some examples described herein include, among other things, a playback device configured to (i) receive digital data representing audio content, (ii) send at least a portion of the digital data to an identification system configured to identify the audio content based on the at least a portion of the digital data, (iii) receive information associated with the audio content from the identification system, (iv) in response to receiving the information associated with the audio content from the identification system, send the received information to a control device that is configured to control the playback device, and (v) play the audio content via one or more speakers electrically connected to the playback device via a wired connection. Other aspects of the examples will be made apparent in the remainder of the description herein.

In one aspect, an example playback device includes one or more processors and a non-transitory computer-readable medium storing instructions that, when executed by the one or more processors, cause or otherwise control the playback device to perform functions. The functions include (i) receiving digital data representing audio content, (ii) sending at least a portion of the digital data to an identification system configured to identify the audio content based on the at least a portion of the digital data, (iii) receiving information associated with the audio content from the identification system, (iv) in response to receiving the information associated with the audio content from the identification system, sending the received information to a control device that is configured to control the playback device, and (v) playing the audio content via one or more speakers electrically connected to the playback device via a wired connection.

In yet another aspect, a non-transitory computer-readable medium stores instructions that, when executed by a playback device, cause or otherwise control the playback device to perform functions. The functions include: (i) receiving digital data representing audio content, (ii) sending at least a portion of the digital data to an identification system configured to identify the audio content based on the at least a portion of the digital data, (iii) receiving information associated with the audio content from the identification system, (iv) in response to receiving the information associated with the audio content from the identification system, sending the received information to a control device that is configured to control the playback device, and (v) playing the audio content via one or more speakers electrically connected to the playback device via a wired connection.

In yet another aspect, an example method performed by a playback device includes (i) receiving digital data representing audio content, (ii) sending at least a portion of the digital data to an identification system configured to identify the audio content based on the at least a portion of the digital data, (iii) receiving information associated with the audio content from the identification system, (iv) in response to receiving the information associated with the audio content from the identification system, sending the received information to a control device that is configured to control the playback device, and (iv) playing the audio content via one or more speakers electrically connected to the playback device via a wired connection.

In yet another aspect, an example control device includes one or more processors and a non-transitory computer-readable medium storing instructions that, when executed by the one or more processors, cause or otherwise control the control device to perform functions. The functions include the control device sending, to a playback device, a command for the playback device to retrieve, from an identification system, information related to digital data that is being received by the playback device. In operation, the playback device is playing audio content represented by the digital data when the command is sent. The functions further include the control device receiving, from the playback device, the information retrieved by the playback device from the identification system. The functions further include the control device displaying (or causing to be displayed) a representation of (i) the received information or (ii) metadata retrieved from a metadata curating device at a network location indicated by the received information. In some embodiments, the control device may display the representation of the received information and/or the retrieved metadata within a graphical user interface on the control device. In other embodiments, the control device may additionally or alternatively display the representation of the received information and/or the retrieved metadata within a graphical user interface on a device in communication with the control device, e.g., a television screen or computer screen that is separate from the control device.

In yet another aspect, a non-transitory computer-readable medium stores instructions that, when executed by a control device, cause or otherwise control the control device to perform functions. The functions include the control device sending, to a playback device, a command for the playback device to retrieve, from an identification system, information related to digital data that is being received by the playback device. In operation, the playback device is playing audio content represented by the digital data when the command is sent. The functions further include the control device receiving, from the playback device, the information retrieved by the playback device from the identification system. The functions further include the control device displaying (or perhaps causing to be displayed) a representation of (i) the received information or (ii) metadata retrieved from a metadata curating device at a network location indicated by the received information. In some embodiments, the control device may display the representation of the received information and/or the retrieved metadata within a graphical user interface on the control device. In other embodiments, the control device may additionally or alternatively display the representation of the received information and/or the retrieved metadata within a graphical user interface on a device in communication with the control device, e.g., a television screen or computer screen that is separate from the control device.

In yet another aspect, an example method performed by a control device includes the control device sending, to a playback device, a command for the playback device to retrieve, from an identification system, information related to digital data that is being received by the playback device. In operation, the playback device is playing audio content represented by the digital data when the command is sent. The method further includes the control device receiving, from the playback device, the information retrieved by the playback device from the identification system. The method further includes the control device displaying (or causing to be displayed) a representation of (i) the received information or (ii) metadata retrieved from a metadata curating device at a network location indicated by the received information. In some embodiments, the control device may display the representation of the received information and/or the retrieved metadata within a graphical user interface on the control device. In other embodiments, the control device may additionally or alternatively display the representation of the received information and/or the retrieved metadata within a graphical user interface on a device in communication with the control device, e.g., a television screen or computer screen that is separate from the control device.

It will be understood by one of ordinary skill in the art that this disclosure includes numerous other embodiments. While some examples described herein may refer to functions performed by given actors such as "users" and/or other entities, it should be understood that this is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102, 104, 106, 108, 110, 112, 114, 116, 118, 120, 122, and 124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
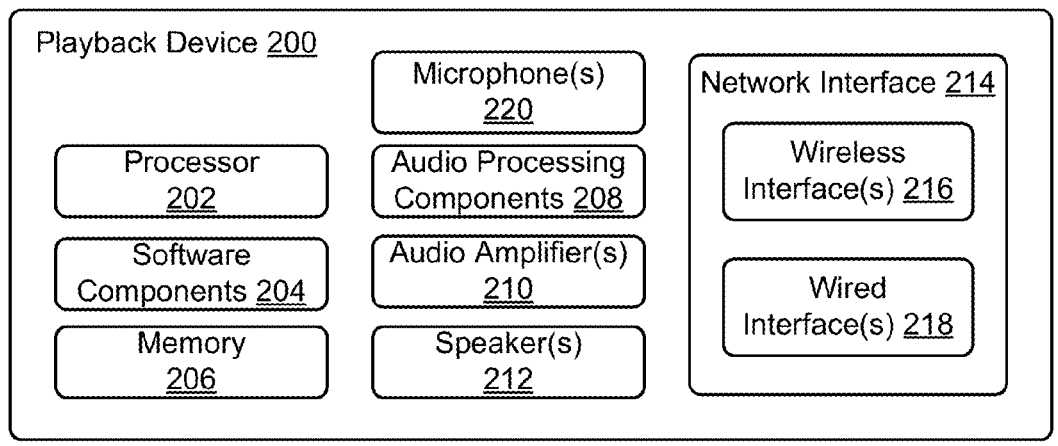
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 might not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The microphone(s) 220 may include an audio sensor configured to convert detected sounds into electrical signals. The electrical signal may be processed by the audio processing components 208 and/or the processor 202. The microphone(s) 220 may be positioned in one or more orientations at one or more locations on the playback device 200. The microphone(s) 220 may be configured to detect sound within one or more frequency ranges. In one case, one or more of the microphone(s) 220 may be configured to detect sound within a frequency range of audio that the playback device 200 is capable or rendering. In another case, one or more of the microphone(s) 220 may be configured to detect sound within a frequency range audible to humans. Other examples are also possible.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11 ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being played by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
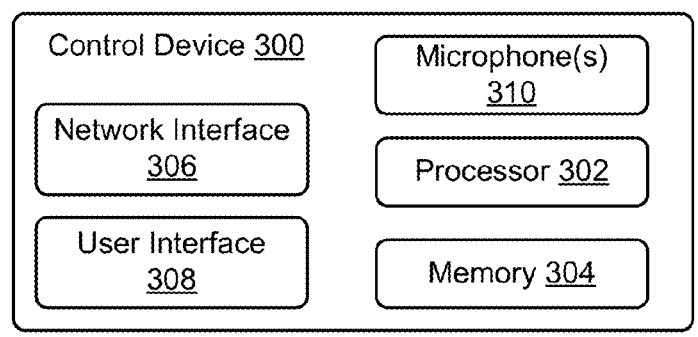
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

The microphone(s) 310 may include an audio sensor configured to convert detected sounds into electrical signals. The electrical signal may be processed by the processor 302. In one case, if the control device 300 is a device that may also be used as a means for voice communication or voice recording, one or more of the microphone(s) 310 may be a microphone for facilitating those functions. For instance, the one or more of the microphone(s) 310 may be configured to detect sound within a frequency range that a human is capable of producing and/or a frequency range audible to humans. Other examples are also possible.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
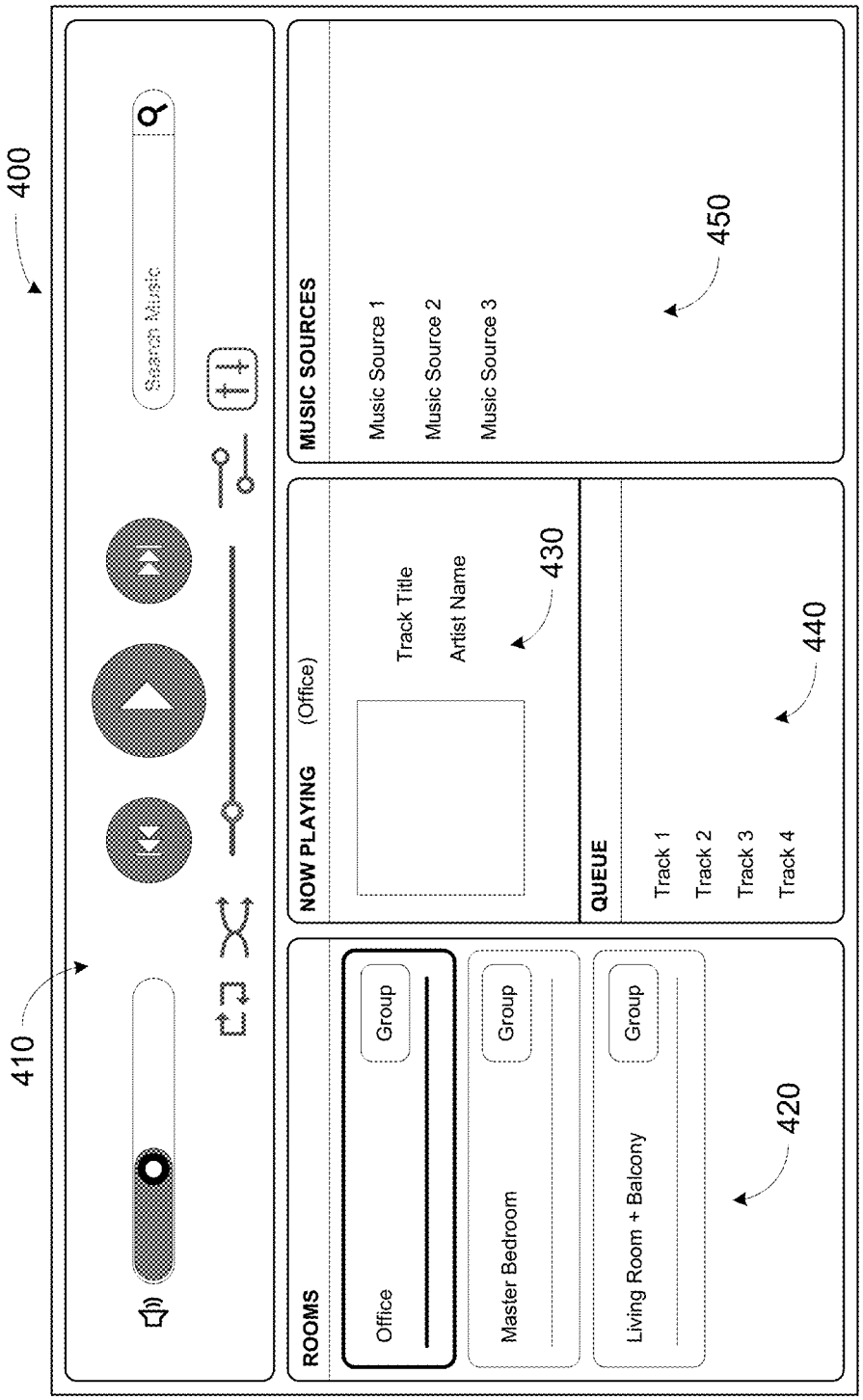
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL)

or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods Related to Identification of Audio Content Facilitated by a Playback Device As discussed above, some examples described herein include, among other things, a playback device (i) receiving digital data representing audio content, (ii) sending at least a portion of the digital data to an identification system configured to identify the audio content based on the at least a portion of the digital data, (iii) receiving information associated with the audio content from the identification system, (iv) in response to receiving the information associated with the audio content from the identification system, sending the received information to a control device that is configured to control the playback device, and (v) playing the audio content via one or more speakers electrically connected to the playback device via a wired connection. Other aspects of the examples will be made apparent in the remainder of the description herein.

Figure 5:
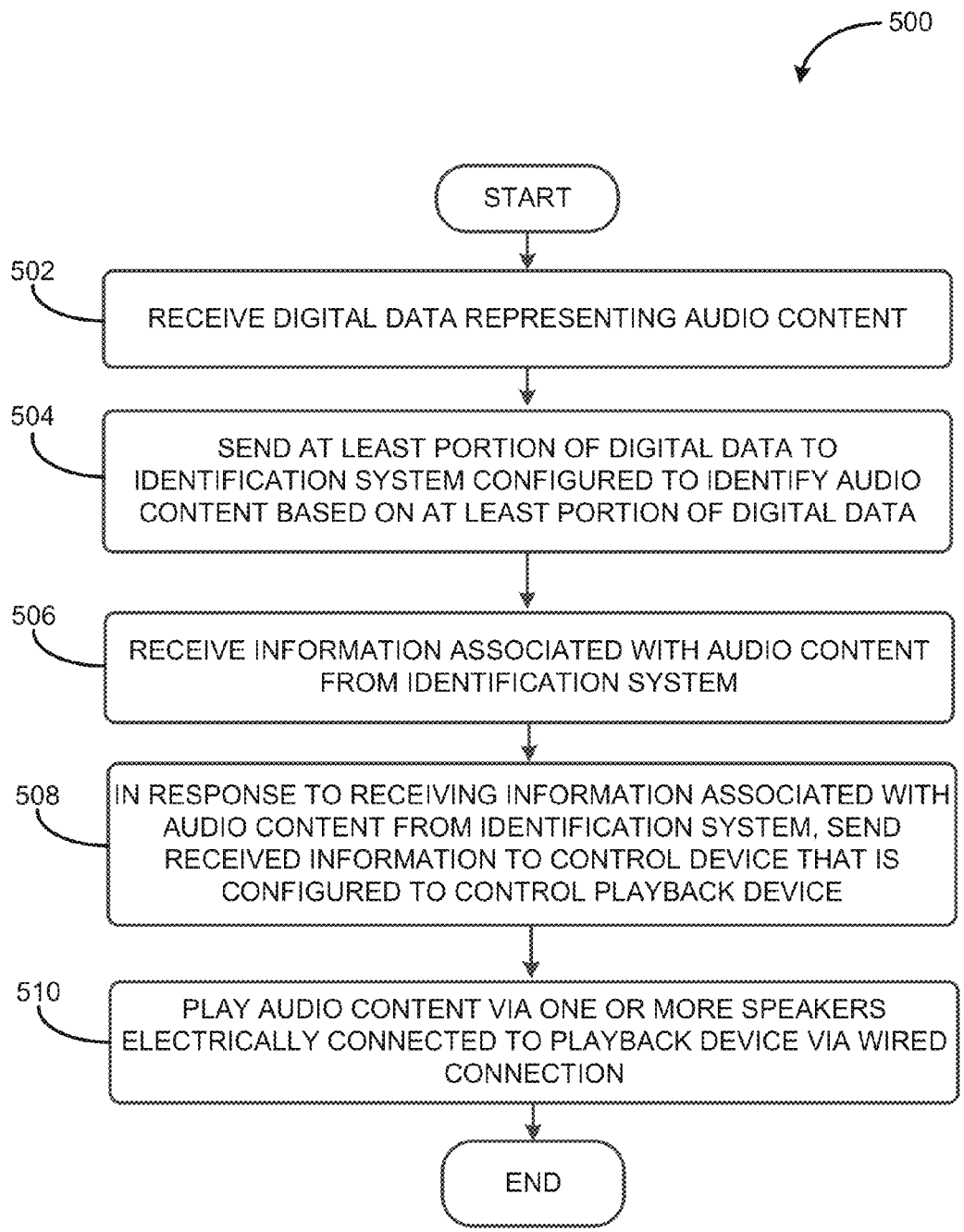
FIG. 5 shows a flow diagram for an example method.
Figure 7:
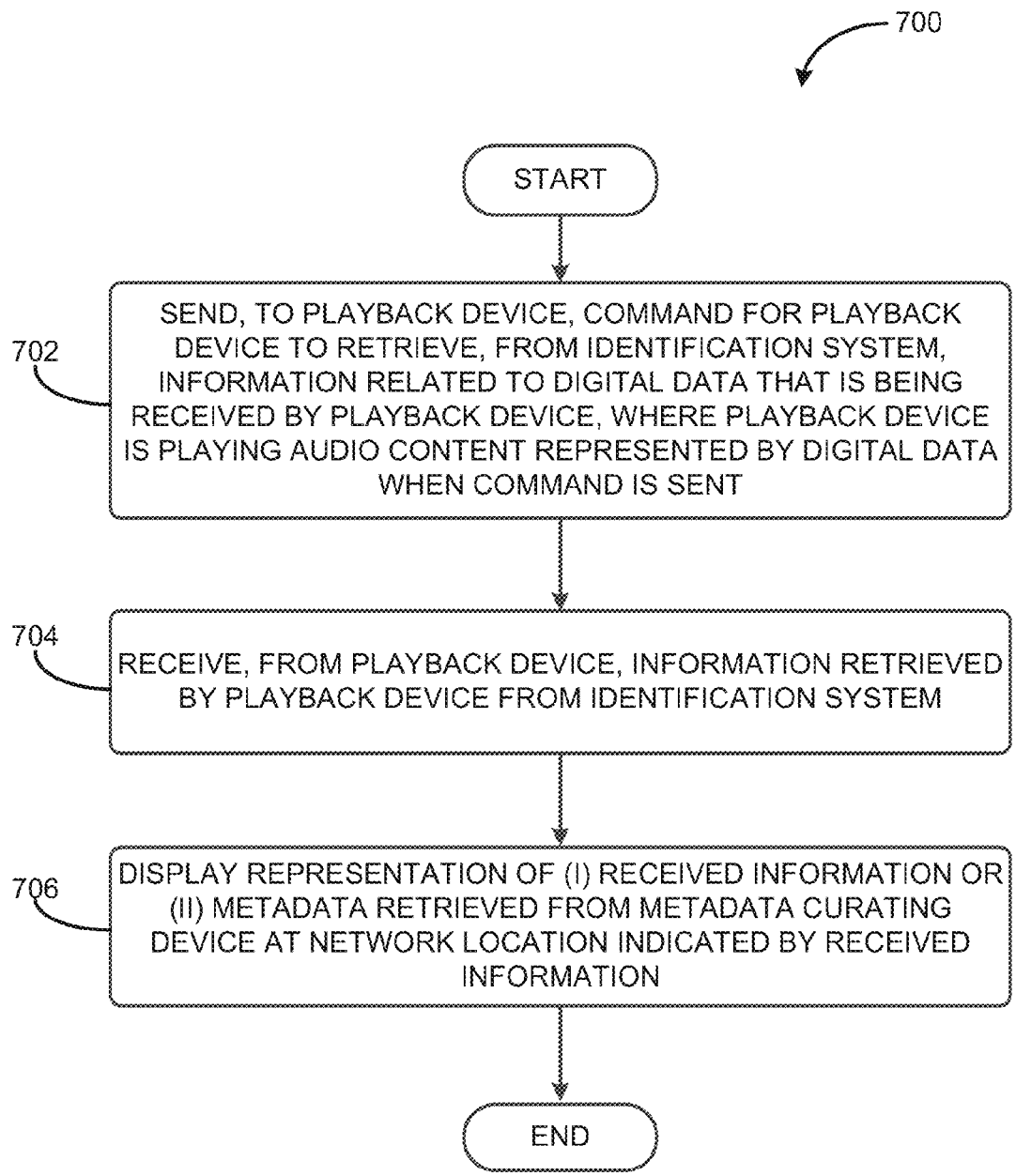
FIG. 7 shows a flow diagram for an example method.

Methods 500 and 700 respectively shown in FIGS. 5 and 7 present example methods that can be implemented within an operating environment including, for example, one or more of the media playback system 100 of FIG. 1, one or more of the playback device 200 of FIG. 2, and one or more of the control device 300 of FIG. 3. Methods 500 and 700 may include one or more operations, functions, or actions as illustrated by one or more of blocks 502, 504, 506, 508, 510, 702, 704, and 706. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the methods 500 and 700 and other processes and methods disclosed herein, the flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk(s) or hard drive(s). In some embodiments, the program code may be stored in memory (e.g., disks or disk arrays) associated with and/or connected to a server system that makes the program code available for download (e.g., an application store or other type of server system) to desktop/laptop computers, smart phones, tablet computers, or other types of computing devices. The computer-readable medium may include non-transitory computer-readable media, for example, such as computer-readable media that stores data for short periods of time like register memory, processor cache, and Random Access Memory (RAM). The computer-readable medium may also include non-transitory media, such as secondary or persistent long-term storage, like read-only memory (ROM), optical or magnetic disks, compact-disc read-only memory (CD-ROM), for example. The computer-readable media may also be any other volatile or non-volatile storage systems. The computer-readable medium may be considered a computer-readable storage medium, for example, or a tangible storage device. In addition, for the methods 500 and 700 and other processes and methods disclosed herein, each block in FIGS. 5 and 7 may represent circuitry that is wired to perform the specific logical functions in the process.

Figure 6A:
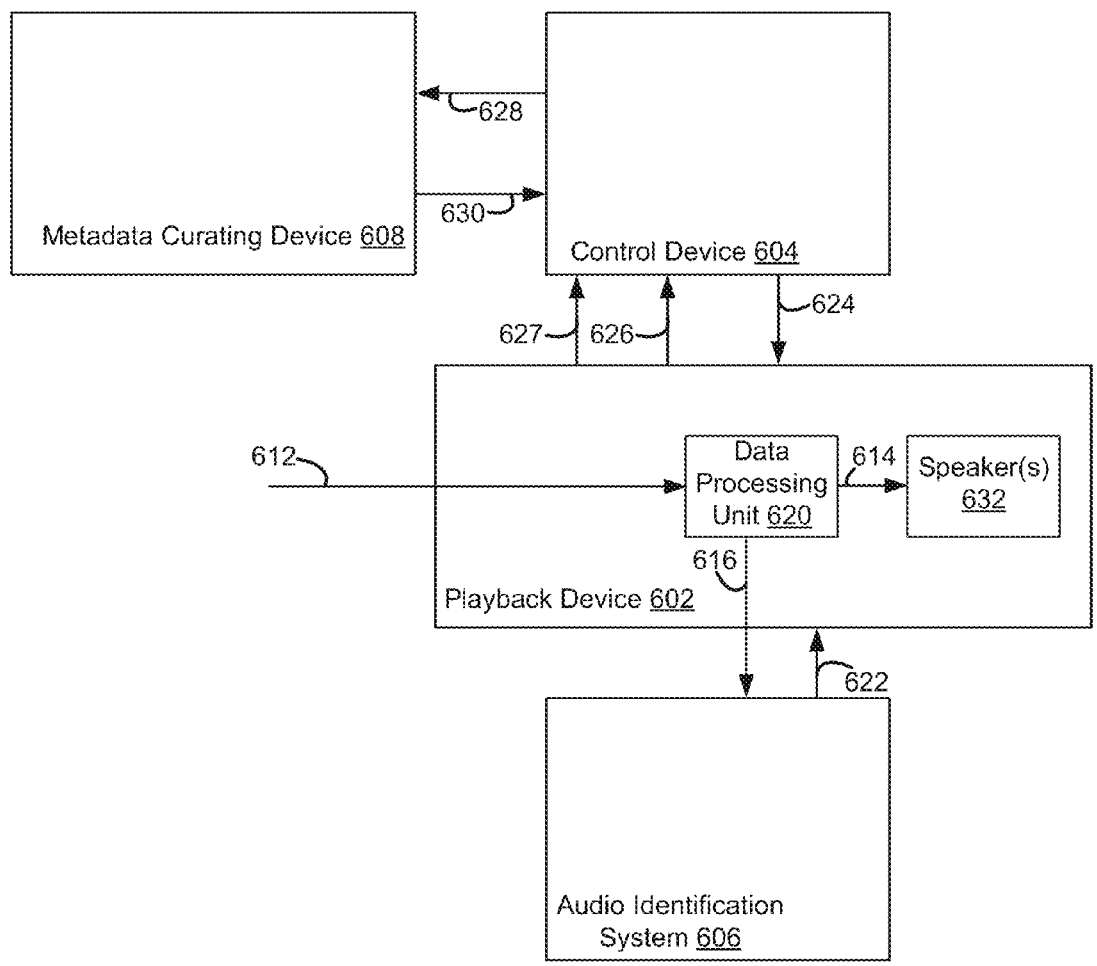
FIG. 6A shows functionality of an example playback system.

At block 502, the method 500 includes receiving digital data representing audio content. Referring to FIG. 6A as an example, the playback device 602 may receive digital data 612 representing audio content from any number of audio content sources described above in Section II.d.

In some examples, the digital data 612 may be received by a data processing unit 620 of playback device 602. The data processing unit 620 may include one or more processing modules such as a decoding module, a sample rate conversion module, a digital signal processing (DSP) module, a digital-to-analog converter (DAC), and/or a crossover. The data processing unit 620 will generally at least include a DAC so that the received digital data 612 may be converted into one or more analog signals 614 and provided to speaker(s) 632 for playback. But the data processing unit 620 may comprise any combination of software, hardware, or firmware suitable for performing operations of the data processing unit 620 described herein.

At block 504, the method 500 includes sending at least a portion of the digital data to an identification system configured to identify the audio content based on the at least a portion of the digital data.

For example, the playback device 602 may send portion 616 of the digital data 612 to the audio identification system 606. The audio identification system 606 may be a device configured to identify audio content represented by the received portion 616. The audio identification system 606 may include a computing device that is communicatively coupled to the playback device 602 via a local-area-network. In another example, the audio identification system 606 may include a server of an audio content identification service that is communicatively coupled to the playback device 602 via a wide-area-network.

At block 506, the method 500 includes receiving information associated with the audio content from the identification system. For example, the playback device 602 may receive the information 622 that is associated with the audio content represented by the received digital data 612 and the portion 616.

The received information 622 may include one or more of (i) metadata related to the audio content, (ii) data identifying a network location of a device from which metadata related to the audio content can be retrieved, (iii) a uniform resource locator identifying a network location of a device from which metadata related to the audio content can be retrieved, and (iv) an identifier recognizable to a metadata curating device as corresponding to metadata related to the audio content. For instance, the information 622 may include a track title, performing entity, composing entity, album title, and/or release date related to the audio content. As another example, the information 622 may include an identifier recognizable to metadata curating device 608 as corresponding to metadata related to the audio content.

The metadata curating device 608 may include any combination of one or more devices and/or servers that stores a database of metadata related to various items of audio content. For example, the database may store data indicating respective associations between various portions of audio data and various portions of metadata.

The metadata curating device 608 may be configured to receive requests for metadata, perhaps from any internet-enabled device. Such requests may include a portion of digital audio data representing audio content that corresponds to the requested metadata. The metadata curating device 608 may be configured to (i) determine that the received digital audio data corresponds to one or more items of metadata stored by the metadata curating device 608 and (ii) return, to the requesting device, the metadata determined to correspond to the received digital audio data.

At block 508, the method 500 involves, in response to receiving the information associated with the audio content from the identification system, sending the received information to a control device that is configured to control the playback device. For example, the playback device 602 may send the information 626 to the control device 604. The information 626 includes at least a portion of the information 622. In some embodiments, the audio identification system 606 may send the information 626 directly to the control device 604 instead of (or perhaps in addition to) the playback device 602.

At block 510, the method 500 involves playing the audio content via one or more speakers electrically connected to the playback device via a wired connection. In some embodiments, the one or more speakers are structurally integrated within the playback device.

For example, the data processing unit 620 of playback device 602 may send one or more analog signals 614 to the speaker(s) 632, and the speaker(s) 632 may play the audio content represented by the analog signals 614. As shown in FIG. 6A, the speaker(s) 632 may be structurally integrated within the playback device 602. Alternatively, the speakers(s) 632 may be located external to the playback device 602 and be electrically connected to the playback device 602 via an audio cable and/or an ouput port (e.g., "line out" port) of the playback device 602.

The method 500 may further include receiving, from the control device, a command for the playback device to send the at least a portion of the digital data to the identification system. In this context, the playback device sends at least a portion of the digital data to the identification system in response to receiving the command from the control device.

For instance, the playback device 602 may receive the command 624 from the control device 604. The command 624 may be a command for the playback device 602 to send the portion 616 to the audio identification system 606. The playback device 602 may send the portion 616 to the audio identification system 606 in response to receiving the command 624.

The method 500 may further involve detecting a discontinuity in the digital data. In this context, the at least a portion of the digital data is sent to the identification system based on the detected discontinuity.

For example, the playback device 602 may detect a discontinuity in the digital data 612. In some embodiments, the digital data 612 may represent audio content provided as output from a television, for instance. The playback device 602 may detect a discontinuity within the digital data 612, such as an indication of a period of silence, for example, perhaps indicating a switch in content being displayed by the television. More specifically, the detected silence may represent a transition from regularly scheduled programming to a commercial advertisement, or that a user has changed the channel on the television. In any event, it may be useful to identify audio content represented by the digital data 612 in response to detecting a discontinuity or other change in content being displayed and/or played out by the television.

In another example, the digital data 612 represents an internet radio stream. Re-identifying the audio content represented by the digital data 612 may be useful in this context as well so that the control device 604 may display current information regarding the dynamically updated audio content represented by the digital data 612. For example, when the playback device 602 detects a discontinuity in the digital data 612, such as a period of silence, the playback device 602 may determine whether the content in the digital data 612 after the discontinuity is the same as or different than the content in the digital data 612 before the discontinuity. If the content in the digital data 612 after the discontinuity is different than the content in the digital data 612 before the discontinuity, then the control device 604 may display information about and/or other metadata associated with the content identified in the digital data 612 after the discontinuity.

The method 500 may further involve sending portions of the digital data to the identification system at periodic instances of time. For example, as the audio content represented by the digital data 612 varies over time, the playback device 602 may be configured to send a new portion 616 of the digital data 612 every five seconds, or perhaps at other time intervals (e.g., every few seconds, every few tens of seconds, every minute, every few minutes, and so on). The playback device 602 may send new portions 616 at other periodic or semi-periodic time intervals as well.

In some examples, the digital data is decoded digital data received from a decoder of the playback device. For example, the received data 612 may be encoded in as MP3, WMA, WAV, or another digital audio format. The data processing unit 620 may include a decoder module that is configured to convert the digital data 612 into pulse-code modulation (PCM) format. In general, the decoder module may be configured to convert any known format of audio data to any other known format of audio data. In this context, decoded data is received by the data processing unit 620 and the playback device 602 provides a decoded portion 616 to the audio identification system 606. This may be useful because, in some examples, the audio identification system 606 may be configured to identify portions of audio data that are encoded in a particular format or formats that is different than the format of digital data 612.

The method 500 may further include processing the digital data to change a sample rate of the digital data. In this context, sending the at least a portion of the digital data comprises sending at least a portion of the processed digital data. For example, the data processing unit 620 may include a sample rate conversion module configured to receive the digital data 612 at a first sample rate and generate digital data representative of the audio content at a second sample rate.

In one example, the playback device 602 may receive the digital data 612 from an optical output port of a television or other output port of a television or other audio and/or video device. The digital data 612 may include a digital representation of the (analog) audio content sampled at a periodic rate of 48 kHz. However, the playback device 602 may be configured to manipulate digital data with a sampling rate of 44.1 kHz, for example. In this case, the data processing unit 620 may alter the digital data 612 so that the portion 616 provided to the audio identification system 606 has a sample rate of 44.1 kHz. The data processing unit 620 may alter the sample rate of digital data via any known sample rate conversion algorithm or similar methods. Such sample rate conversion may involve converting digital data of any first sample rate to digital data of any second sample rate. For example, the audio identification system 606 may be configured to identify portions of digital audio data of a particular sample rate or sample rates. For that reason, it may be useful to convert the digital data 612 to a portion 616 having the particular sample rate or at least one of the sample rates usable by the audio identification system 606.

In some examples, the playback device includes a first data processing module and a second data processing module and the digital data is first digital data received as output from the first data processing module. In this context, the method 500 may further involve receiving second digital data as output from the second data processing module and sending at least a portion of the second digital data to the identification system.

It may be useful for the playback device to send digital data to different audio identification systems in different situations. For instance, the playback device may send digital data to a first audio identification system and receive, from the first audio identification system, a message indicating that the first audio identification system was unable to (i) identify the audio content and (ii) retrieve the information related to the audio content. Here, the playback device may send the digital data to a second audio identification system for retrieval of the information. However, the second audio identification system may be configured to receive digital data corresponding to sample rates, frequency ranges, format, etc. that are different than those for which the first audio identification system is configured to receive. In this case, it may be useful for the playback device to extract the digital data from different stages of the audio pipeline of the playback device depending on which audio identification system the extracted data is to be sent to.

Figure 6B:
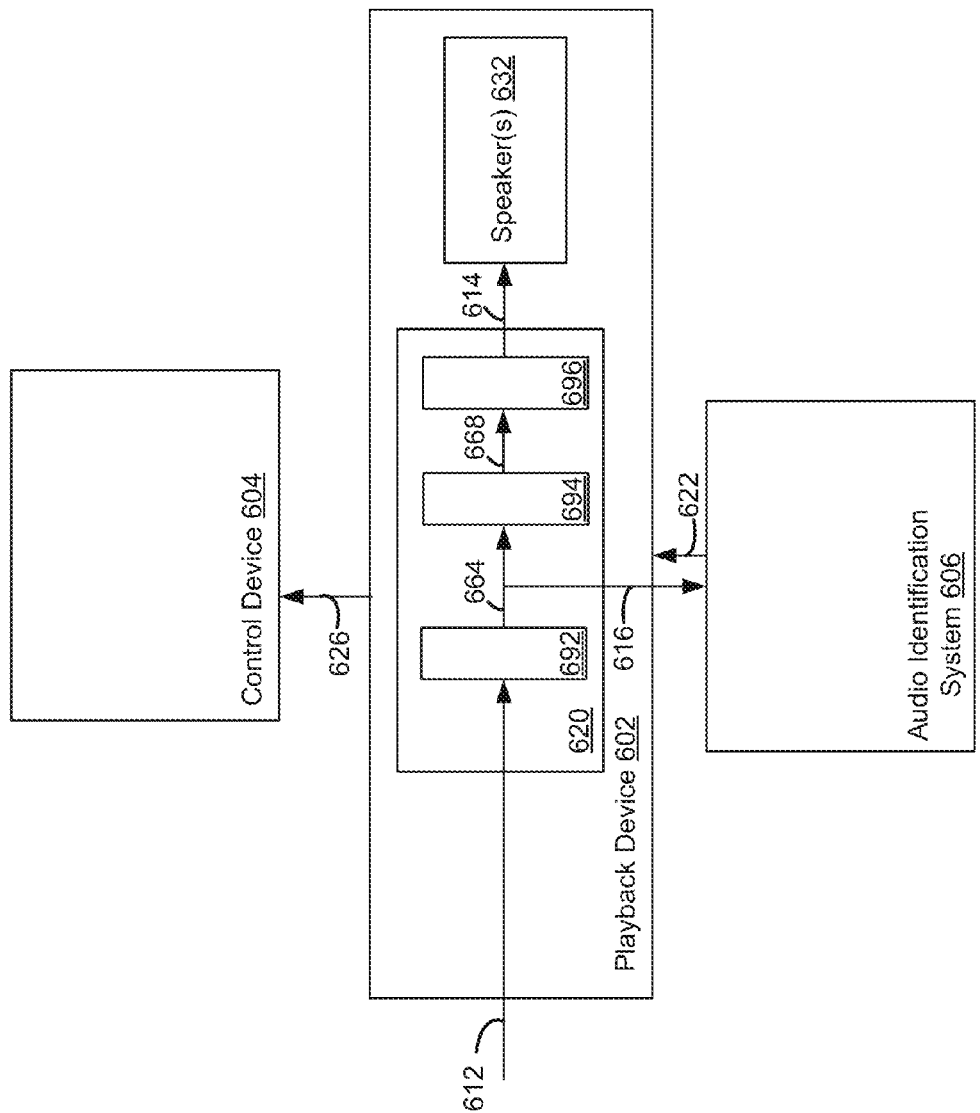
FIG. 6B shows an example playback device extracting digital data for audio content identification from a first position of an audio pipeline.

For instance, the playback device 602 may be configured to dynamically change a position of an audio pipeline from which the playback device 602 retrieves digital data for audio content identification. Referring to FIG. 6B, the data processing unit 620 of the playback device 602 may form an audio pipeline including a first data processing module 692, a second data processing module 694, and a DAC 696. The first data processing module 692 may include one or more of a sample rate conversion module, a DSP module, or decoding module, for example. Similarly, the second data processing module 694 may include one or more of a sample rate conversion module, a DSP module, or a decoding module. The first data processing module 692 may be configured to use the digital data 612 to generate processed data 664. The second data processing module 694 may be configured to use the processed data 664 to generate further processed data 668. The DAC 696 may use the further processed data 668 to generate the analog signals 614.

In this context, the portion 616 provided to the audio identification system 606 by the playback device 602 may be a portion of the processed data 664 from the output of the first processing module 692. Thereafter, the playback device 602 may begin extracting data for audio content identification from a different position of the audio pipeline. Referring to FIG. 6C for example, the playback device 602 may provide portion 617 of the further processed data 668 to the audio identification system 606. The audio identification system 606 may use the portion 617 to retrieve information 623 related to the audio content. Accordingly, the playback device 602 may receive information 623 and provide at least a portion 627 of the information 623 to the control device 604. In this way, the playback device 602 is configured to dynamically change a position of the audio pipeline from which the playback device 602 retrieves digital data for audio content identification. In some embodiments, the audio identification system 606 may send the information 623 directly to the control device 604 instead of (or perhaps in addition to) the playback device 602.

The method 500 may further involve segregating the digital data into a plurality of portions representing respective audio frequency ranges of the audio content. In this context, sending the at least a portion of the digital data may include sending a given portion of the segregated plurality of portions of the digital data.

Figure 6D:
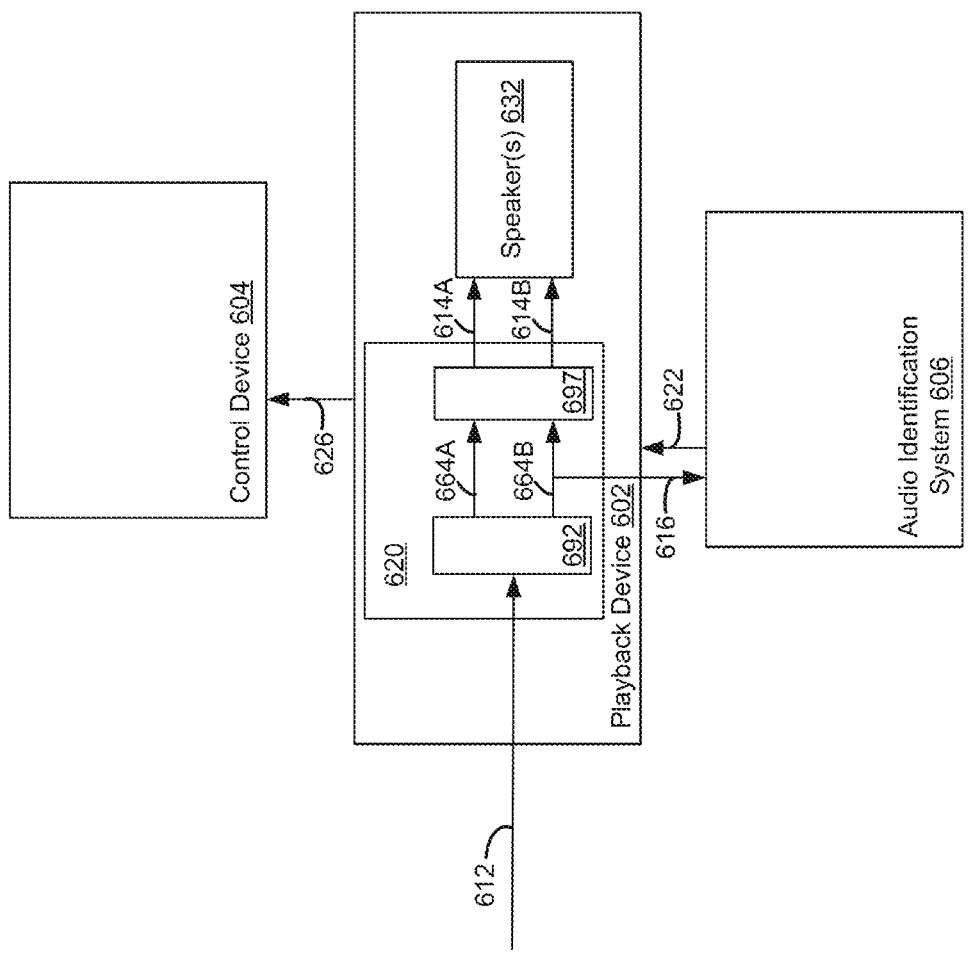
FIG. 6D shows an example playback device extracting frequency-segregated digital data for audio content identification.

Referring to FIG. 6D, the data processing unit 620 of the playback device 602 may include a crossover 692 and a DAC 697. The crossover 692 may receive the digital data 612 and segregate the digital data 612 into portions 664A and 664B that correspond to respective frequency ranges of the audio content. For example, the portion 664A may correspond to a bass frequency range for playback by a subwoofer of speaker(s) 632, whereas the portion 664B may correspond to another frequency range for playback by midrange drivers and/or tweeters of the speaker(s) 632. The portions 664A and 664B may correspond to other respective frequency ranges as well. The DAC 697 may then convert the portions 664A and 664B into respective analog signals 614A and 614B for playback by the speakers 632. In other examples, the digital data 612 may first be converted into an analog signal and then the analog signal may be segregated into respective frequency ranges via one or more discrete filters.

As shown in FIG. 6D, the playback device 602 sends the portion 616 to the audio identification system 606 for identification of the audio content. In this example, the portion 616 is extracted from the portion 664B at the output of the crossover 692. The playback device 602 may then receive, from the audio identification system 606, information 622 related to the audio content represented by the portion 616. The playback device 602 may also send information 626 to the control device 604. The information 626 may include at least a portion of information 622. In some embodiments, the audio identification system 606 may send the information 622 directly to the control device 604 instead of (or perhaps in addition to) the playback device 602.

Referring to FIG. 7, at block 702 the method 700 includes sending, to a playback device, a command for the playback device to retrieve, from an identification system, information related to digital data that is being received by the playback device. In this context, the playback device may be playing audio content represented by the digital data when the command is sent.

Referring to FIG. 6A for example, the control device 604 may send the command 624 to the playback device 602. The command 624 may be a command for the playback device 602 to retrieve, from the audio identification system 606, information 622 related to the digital data 612. The playback device 602 may be playing audio content represented by the digital data 612 when the command 624 is sent. For example, the control device 604 may send the command 624 while the playback device 602 is providing the one or more analog signals 614 to the speaker(s) 632 for playback.

At block 704, the method 700 includes receiving, from the playback device, the information retrieved by the playback device from the identification system. For example, the control device 604 may receive the information 626 from the playback device 602. The information 626 may include at least a portion of the information 622.

Figure 8:
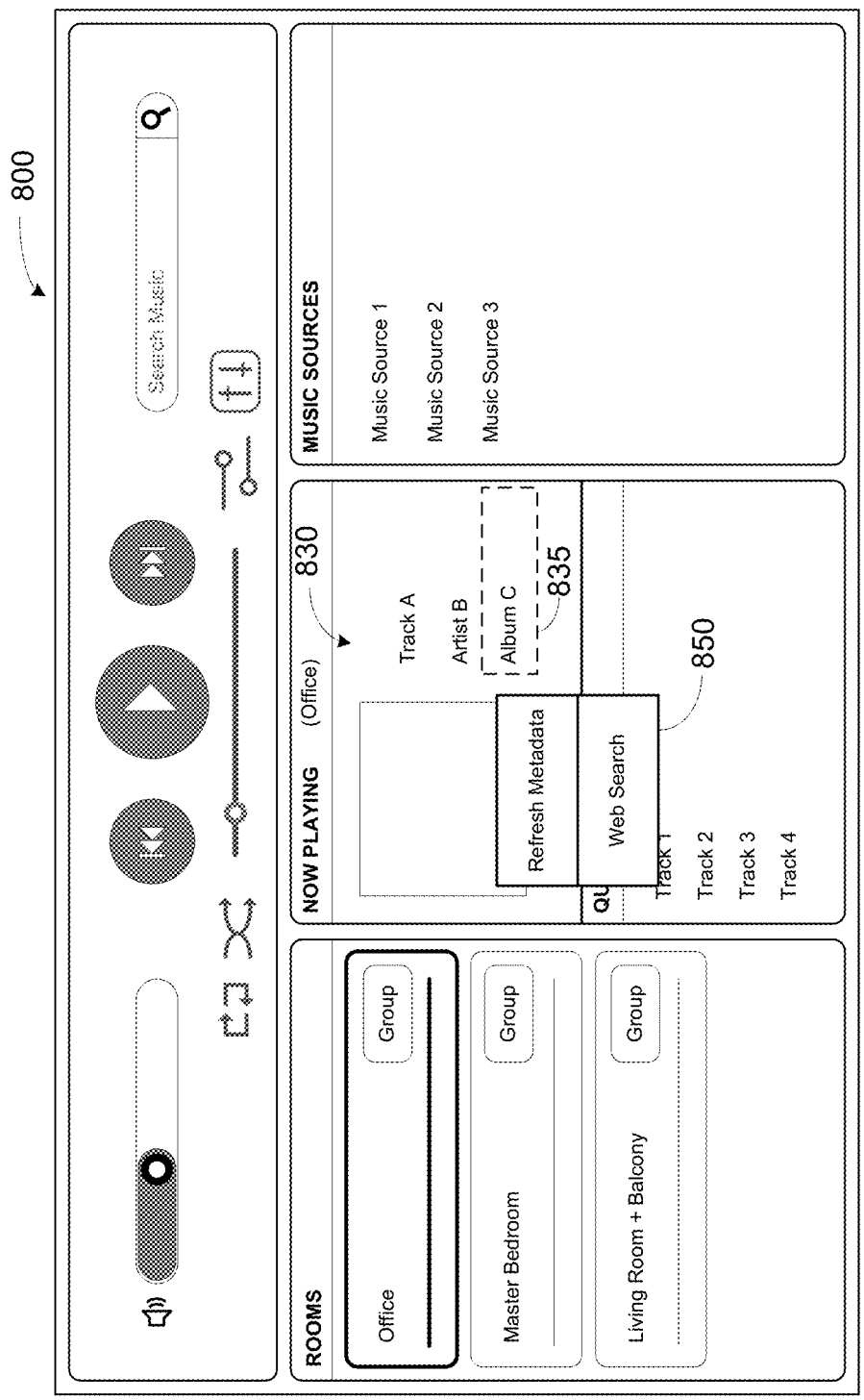
FIG. 8 shows an example controller interface.

At block 706, the method 700 includes displaying a representation of (i) the received information and/or (ii) metadata retrieved from a metadata curating device at a network location indicated by the received information. As an example, FIG. 8 shows a controller interface 800 that may be displayed by the control device 604. The controller interface 800 may include a playback status region 830 and a popup menu 850.

In one example, with reference to FIG. 6A, the information 626 may include a track title and an artist name that are related to the digital data 612. Accordingly, the control device 604 may display a representation of the track title and the artist name as shown in the playback status region 830 shown in FIG. 8.

In another example (not shown), the information 626 may include a network location of the metadata curating device 608. The control device 604 may use the network location to send a request 628 for the metadata to the metadata curating device 608. The control device 604 then may receive the metadata 630 from the metadata curating device 608. The metadata 630 may include a track title and an artist name related to the digital data 612, and a representation of this information may be displayed within the playback status region 830.

In some examples, the received information may include an identifier recognizable to the metadata curating device 608 as corresponding to metadata related to the audio content. Accordingly, the method 700 may further include sending the identifier to the metadata curating device and receiving the metadata related to the audio content from the metadata curating device.

For example, the information 626 may include an identifier (or identifiers) recognizable to the metadata curating device 608 as corresponding to metadata related to the audio content. The control device 604 may send the identifier(s) with the request 628, so that the metadata curating device 608 uses the identifier(s) to retrieve the metadata 630 related to the audio content. Then the control device 604 may receive the metadata 630 from the metadata curating device 608 and display a representation of the metadata 630 within the playback status region 830.

The method 700 may further include receiving a command input for the playback device to retrieve the information related to the digital data. In this context, the command is sent in response to (or at least based on) receiving the command input.

For example, the control device 604 may receive, via the controller interface 800, a command input for the playback device 602 to retrieve the information 622. For example, with reference to FIG. 8, the controller interface 800 may receive a touch input at the playback status region 830. In response, the controller interface 800 may provide the popup menu 850 which presents a choice of either refreshing the metadata fields that are displayed in the playback status region 830 or searching for additional information.

For example, choosing "Refresh Metadata" may cause the control device 604 to send the command 624. In this context, the command 624 may be a command to refresh the displayed metadata or to retrieve metadata that is lacking from the display.

Choosing "search" may cause the playback device 602 or the control device 604 to perform a web search and provide search results related to the audio content represented within the playback status region 830.

In some examples, the information related to the digital data pertains to a given category of information. In this context, the method 700 may further involve receiving metadata related to the audio content from the playback device and determining that the metadata received from the playback device lacks the information pertaining to the given category of information. In this context, the command may be sent in response to (or at least based on) determining that the metadata received from the playback device lacks the information pertaining to the given category of information.

For example, the control device 604 may receive metadata 627 from the playback device 602. The control device 604 may determine that the metadata 627 lacks information pertaining to an album name. Accordingly, the control device 604 may send the command 624 in response to (or at least based on) determining that the information pertaining to the album name is lacking from the metadata 627. The playback device 602 then retrieves information 622 and provides information 626 in response to the command 624. As a result, the control device 604 receives the lacking information pertaining to the album name and may display such information at area 835 of the controller interface 800.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A playback device comprising:
   a network interface;
   one or more processors; and
   tangible, non-transitory, computer-readable media storing instructions that, when executed by the one or more processors, cause the playback device to perform functions comprising:
   receiving, via the network interface, digital data corresponding to audio content;
   playing the audio content via one or more speakers coupled to the playback device; and
   while playing the audio content via the one or more speakers:
   sending, via the network interface, a portion of the received digital data to a server of an identification system to identify metadata corresponding to the audio content based on the portion of the received digital data;
   receiving the metadata corresponding to the audio content from the identification system; and
   in response to receiving the metadata corresponding to the audio content from the identification system, causing a control device to display a graphical representation of the received metadata wherein causing the control device to display the graphical representation comprises sending, via the network interface, the received metadata to the control device.

2. The playback device of claim 1, wherein the one or more speakers are structurally integrated within the playback device.

3. The playback device of claim 1, wherein sending the portion of the received digital data to the server of the identification system comprises sending decoded digital data received from a decoder of the playback device.

4. The playback device of claim 1, wherein sending the portion of the received digital data to the identification system comprises:
receiving, via the network interface from the control device, a command for the playback device to send the portion of the received digital data to the identification system; and
sending the portion of the received digital data to the identification system based on the received command.

5. The playback device of claim 1, wherein sending the portion of the received digital data to the identification system comprises:
detecting a discontinuity in the received digital data; and
sending the portion of the received digital data to the identification system based on the detected discontinuity.

6. The playback device of claim 1, the functions further comprising sending portions of the received digital data to the identification system at periodic instances of time.

7. The playback device of claim 1, wherein sending the portion of the received digital data to the identification system comprises:
processing the received digital data to change a sample rate of the received digital data; and
sending at least a portion of the processed digital data to the identification system.

8. The playback device of claim 1, further comprising a first data processing module and a second data processing module, wherein the digital data comprises first digital data and second digital data, wherein receiving the digital data corresponding to the audio content comprises: receiving the first digital data from the first data processing module; and receiving the second digital data from the second data processing module; and wherein sending the portion of the received digital data to the identification system comprises sending a portion of the second digital data to the identification system.

9. The playback device of claim 1, wherein sending the portion of the received digital data to the identification system comprises:
segregating the received digital data into a plurality of portions representing respective audio frequency ranges of the audio content; and
sending a given portion of the segregated plurality of portions of the received digital data to the identification system.

10. The playback device of claim 1, wherein sending the portion of the received digital data to the identification system comprises:
compressing the portion of the received digital data; and
sending the compressed portion of the received digital data to the identification system.

11. The playback device of claim 1, wherein sending the received metadata to the control device comprises sending one or more of (i) metadata related to the a particular audio track within the audio content, (ii) data identifying a network location of a particular device from which metadata related to the audio content can be retrieved, (iii) a uniform resource locator identifying a network location of the particular device from which metadata related to the audio content can be retrieved, and (iv) an identifier recognizable to a metadata curating device as corresponding to metadata related to the audio content.

12. Tangible, non-transitory, computer-readable media storing instructions that, when executed by one or more processors of a control device, cause the control device to perform functions comprising:
while a playback device is playing audio content, sending, via a network interface to the playback device, a command for the playback device to send, to a server of an identification system, a portion of digital data corresponding to the audio content, wherein the identification system identifies metadata corresponding to the audio content based on the portion of the digital data;
receiving, via the network interface from the playback device, the metadata corresponding to the audio content; and
causing a graphical display to display a graphical representation of the received metadata.

13. The tangible, non-transitory, computer-readable media of claim 12, wherein the received metadata comprises a network location of the metadata curating device, the functions further comprising:
sending, via the network interface, a request for additional metadata to the metadata curating device at the network location; and
receiving, via the network interface, the additional metadata from the metadata curating device.

14. The tangible, non-transitory, computer-readable media of claim 12, wherein the received metadata comprises an identifier recognizable to the metadata curating device as corresponding to additional metadata related to the audio content, the functions further comprising:
sending, via the network interface, the identifier to the metadata curating device; and
receiving, via the network interface, the additional metadata related to the audio content from the metadata curating device.

15. The tangible, non-transitory, computer-readable media of claim 12, wherein sending the command for the playback device to send, to the server of the identification system, the portion of the digital data corresponding to the audio content comprises:
receiving selection of a command input corresponding to the command for the playback device to send, to the server of the identification system, the portion of the digital data corresponding to the audio content; and
in response to receiving selection of the command input, sending, to the playback device, the command for the playback device to send, to the server of the identification system, the portion of the digital data corresponding to the audio content.

16. The tangible, non-transitory, computer-readable media of claim 12, wherein the metadata is second metadata pertaining to a given category of information, the functions further comprising:
receiving, via the network interface, first metadata related to the audio content from the playback device; and
wherein sending the command for the playback device to send, to the server of the identification system, the portion of the digital data corresponding to the audio content comprises:

determining that the first received metadata lacks the second metadata pertaining to the given category of information; and based on determining that the received metadata lacks the second metadata information pertaining to the given category of information, sending the command for the playback device to send, to the identification system, the portion of the digital data corresponding to the audio content.

17. Tangible, non-transitory, computer-readable media storing instructions that, when executed by one or more processors of a playback device, cause the playback device to perform functions comprising:

receiving, via a network interface, digital data corresponding to audio content;

playing the audio content via one or more speakers coupled to the playback device;

while playing the audio content via the one or more speakers:

sending, via the network interface, a portion of the received digital data to a server of an identification system to identify metadata corresponding to the audio content based on the portion of the received digital data;

receiving, via the network interface, metadata corresponding to the audio content from the identification system; and in response to receiving the metadata corresponding to the audio content from the identification system, causing a control device to display a graphical representation of the received metadata, wherein causing the control device to display the graphical representation comprises sending, via the network interface, the received metadata to the control device.

18. The tangible, non-transitory, computer-readable media of claim 17, wherein sending the portion of the received digital data to the identification system comprises:

receiving, via the network interface from the control device, a command for the playback device to send the portion of the received digital data to the identification system; and sending the portion of the received digital data to the identification system based on the received command.

19. The tangible, non-transitory, computer-readable media of claim 17, wherein the playback device comprises a first data processing module and a second data processing module, wherein the digital data comprises first digital data and second digital data, and wherein receiving the digital data corresponding to the audio content comprises: receiving the first digital data from the first data processing module; and receiving the second digital data from the second data processing module; and wherein sending the portion of the received digital data to the identification system comprises sending a portion of the second digital data to the identification system.

20. The playback device of claim 1, wherein the one or more speakers coupled to the playback device are (a) housed within an enclosure of the playback device or (b) external to the enclosure of the playback device and physically connected to the playback device.

21. The tangible, non-transitory, computer-readable media of claim 17, wherein the one or more speakers coupled to the playback device are (a) housed within an enclosure of the playback device or (b) external to the enclosure of the playback device and physically connected to the playback device.

22. The playback device of claim 1, wherein the control device is a first control device, and wherein the functions further comprise:

in response to receiving the metadata corresponding to the audio content from the identification system, causing a second control device to display a graphical representation of the received metadata wherein causing the second control device to display the graphical representation comprises sending, via the network interface, the received metadata to the second control device.

* * * * *